Feb. 27, 1951 R. A. SANDBERG 2,543,510
STRAIGHT PULL BRAKE LEVER ASSEMBLY
Filed March 30, 1948 2 Sheets-Sheet 1
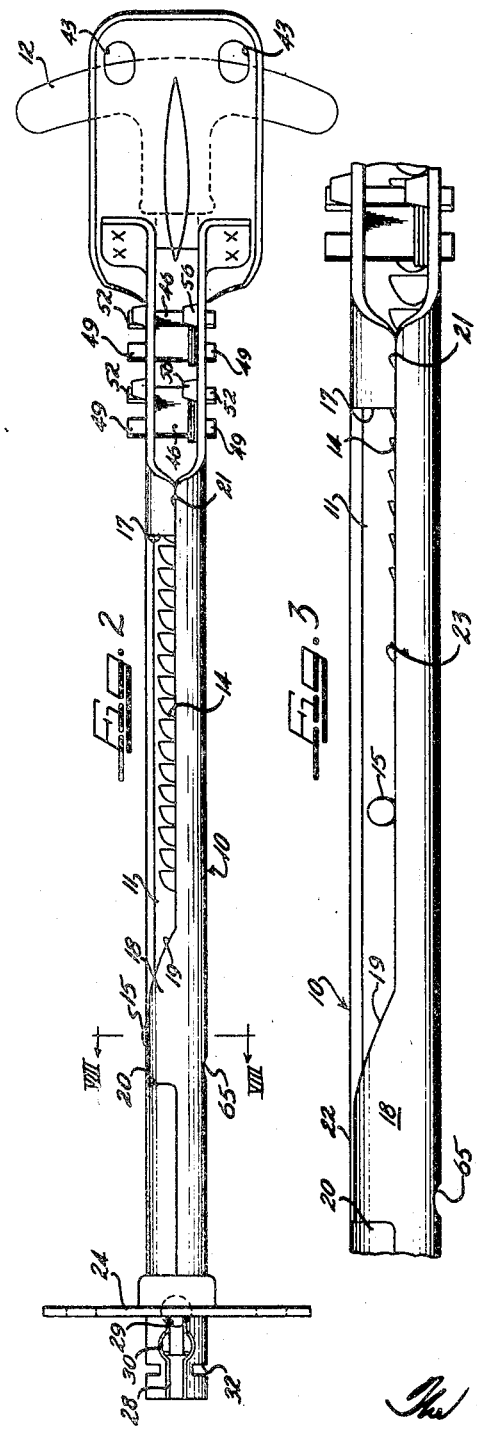
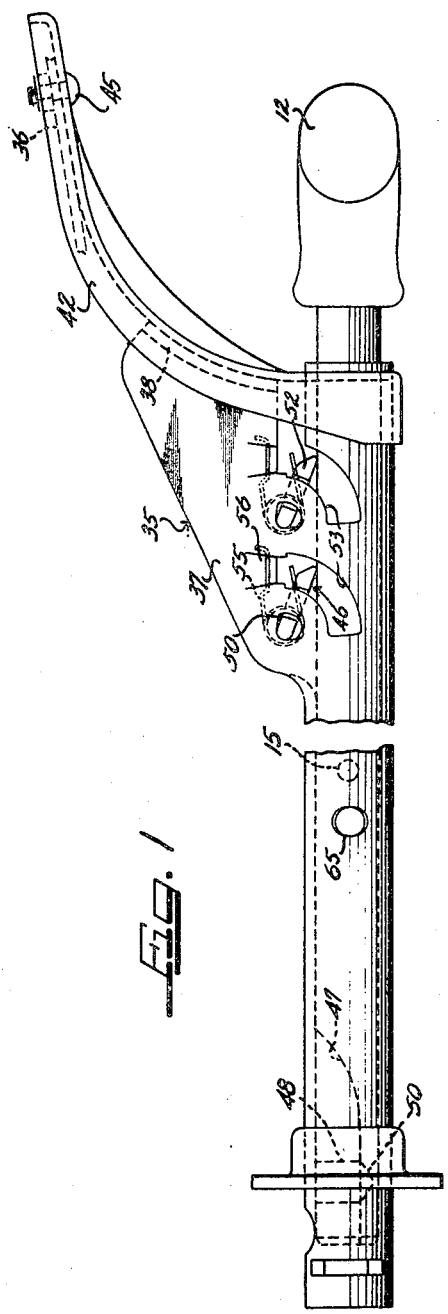
Inventor
Ray A. Sandberg

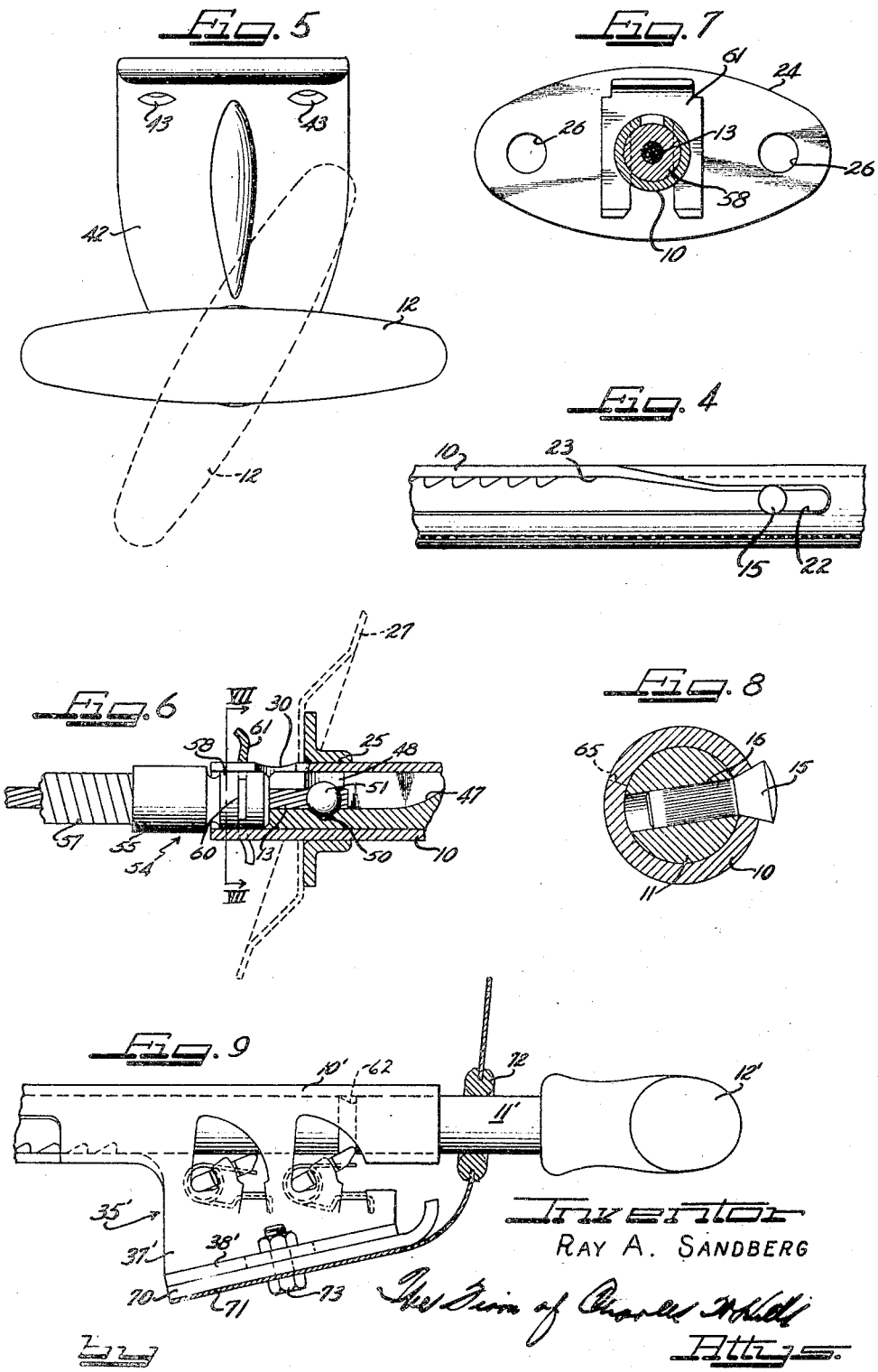

Patented Feb. 27, 1951

2,543,510

UNITED STATES PATENT OFFICE 2,543,510

STRAIGHT PULL BRAKE LEVER ASSEMBLY

Ray A. Sandberg, Waukegan, Ill., assignor to Houdaille-Hershey Corporation, Detroit, Mich., a corporation of Michigan Application March 30, 1948, Serial No. 17,822

9 Claims. (Cl. 74—502)

1

The present invention relates to improvements in brake lever assemblies and more particularly to straight pull brake lever assemblies which are especially adaptable for use in connection with the emergency brakes of automobiles and the like.

It is an important object of this invention to provide an improved straight pull brake lever assembly including novel rotational return means for the reciprocal and rotary pull rod.

Another object of this invention is to provide an improved structure in a straight pull brake lever for connecting a brake operating cable to the pull rod.

A further object of this invention is to provide an improved support structure for supporting and guiding the pull rod in a straight pull brake lever assembly.

A still further object of this invention is to provide an improved, simplified and efficient straight pull brake lever assembly.

Other objects, features and advantages of the present invention will be readily apparent from the following detailed description of certain preferred embodiments thereof taken in conjunction with the accompanying drawings, in which:

Figure 1 is a fragmental side elevational view of a straight pull brake lever assembly embodying the features of the present invention;

Figure 2 is a plan view of the straight pull brake lever assembly of Figure 1;

Figure 3 is a fragmentary plan view of the brake lever assembly showing the pull rod rotated to brake-releasing position;

Figure 4 is a fragmentary elevational view of the side of the pull rod and guide tube opposite to that of Figure 1 and showing the pull rod in its forward fully released position;

Figure 5 is an end elevational view of the brake lever assembly;

Figure 6 is a vertical sectional view taken through the center of the forward end of the brake lever assembly showing the brake cable and connector therefor secured in the brake lever assembly;

Figure 7 is a vertical sectional view taken substantially on line VII—VII of Figure 6;

Figure 8 is a vertical sectional view taken substantially on line VIII—VIII of Figure 2; and Figure 9 is a fragmentary side elevational view, partly in section, of a modified form of the straight pull brake lever assembly of the present invention.

The brake lever assembly of the present invention includes a novel, improved supporting and guiding tube member 10 for a reciprocable, rotary, ratchet type cylindrical brake actuating member or pull rod 11. At the rearward end, the rod 11 is provided with a handle 12 which projects into the inside of a vehicle, such as an automobile, at a point within convenient reach of the driver of the automobile. At the forward end of the pull rod 11, a braking cable 13 is secured to the rod in a manner which will be described hereinafter.

A plurality of ratchet teeth 14 is provided in a uniform series on the upper surface of the pull rod 11 and a guide or follower pin 15 (Figures 2, 3 and 8) is pressed into an aperture 16 in the rod and projects radially outwardly therefrom at a point angularly displaced from and forwardly of the ratchet teeth.

The tube 10 may be conveniently formed from a tubularly shaped sheet metal piece having at one margin an elongated cut-out portion 17 disposed substantially midway along the length of the tube. At the other margin a cam portion 18 projects laterally toward the opposite margin and has a slanted cam surface 19. On assembly, the longitudinal margins are brought together in abutting relation. If desired the seams may be welded, as at 20 and 21 to form a solid joint. The cam portion 18 extends partially into the cut-out portion 17 and provides, as seen in Figure 4, an axially extending guide slot 22 forwardly of the cam surface 19 and an enlarged slot 23 rearwardly of the slanted edge 19.

The supporting and guiding tube 10 is of a length to extend between fixed portions of the vehicle so as to guide the pull rod 11 in a fixed, reciprocal path. To this end, the forward end of the tube is preferably provided with an attachment flange 24 which may be secured in any suitable manner, as by welding, to the tube 10.

For stability, the flange 24 may be of horizontally oval form (Figure 7) having a central aperture 25 through which the forward end portion of the tube 10 projects, and a plurality of bolt holes 26 adjacent its ends. At the forward extremity of the tube 10 where it projects beyond the flange 24, a pair of aligned axial slots 28 and 29, connected by an enlarged aperture 30 is provided in the tube wall. Also, a pair of diametrically opposite chordal slots 32 are formed through the wall of the tube forwardly of the aperture 30 and 90° each way from the slot 28. These axial slots and chordal slots are for the purpose of securing the cable 13 to the pull rod 11. The flange 24 is adapted to be secured by bolts, (not shown) disposed through the holes 26 to a fixed member 27 (Figure 6) of the vehicle comprising, for example, the fire wall of an automobile.

At its rear end, the guide tube 10 is preferably formed with a structure 35 by which it is adapted to be attached to a fixed part of the vehicle with which the assembly is associated, such as a portion 36, of the instrument panel (Figure 1). To this end, the structure 35 comprises integral upstanding walls 37 having laterally extending coplanar rear marginal flanges 38 to which is secured a connecting and reinforcing plate 42, as by welding. The reinforcing plate 42 has appropriate apertures 43 near its rearmost portion for accommodating attachment bolts 45, by which the plate may be attached to the instrument panel portion 36.

The structure 35 also serves as a pawl housing for controlling longitudinal or reciprocal disposition of the pull rod 11. For this purpose, a pair of pawl members 46 is supported by the walls 37 for selective engagement with the ratchet teeth 14 on the pull rod 11, said teeth being engageable with the pawls 46 when the rod 11 is pulled rearwardly, whereby to hold the pull rod 11 in brake-setting position. The pawls 46 are formed with oppositely extending respective arms 49 which are pivotal in openings 50 in the walls 37 above the pull rod 11 and also with respective laterally oppositely extending arms 52 which extend through and are swingable within arcuate slots 53 in the walls 37, the pawls being held in ratcheting position by torsion springs 55 spiraled about the respective arms 49 of the pawls and having one leg engaging the adjacent arm 52 of the pawls and the other leg engaging a fixed, integrally struck out biasing lug 56 upon a selected one of the walls 37. As a result, when the rod 11 is pulled rearwardly by means of the handle 12, the pawls 46 engage successive ratchet teeth 14 for incremental brake setting adjustment of the pull rod. For a more detailed description of the pawl and ratchet structure and operation, and the pawl housing provided by the guide tube, reference may be had to my copending application Serial No. 779,183, filed October 10, 1947.

As best seen in Figures 6 and 7, a substantially vertical groove 47 is cut into the forward end of the pull rod 11 and a hole 48 of a diameter greater than the width of the groove 47 is drilled vertically in the rod at a point spaced axially from the forward end of the rod with the middle of the groove as center of the hole. The hole 48 is drilled to a depth slightly greater than the depth of the groove, so that a conical seat 50 is formed in the bottom of the groove to receive a ball-shaped anchor member 51 that is swaged, or otherwise secured, to the end of the cable 13.

A connector sleeve 54 is disposed around the cable 13, spaced forwardly from the ball-shaped member 51. The connector 54 has a tubular body portion 55 in which an outer cable conduit 57 is secured. A reduced tubular body portion 58 on the body 55 fits securely in the forward end of the tube 10. Slots 60 on either side of the reduced tubular body portion 58 are arranged to match with the chordal slots 32 formed in the end of the tube 10 (Figure 2). A generally U-shaped retaining clip member 61 may be disposed over the tube 10 with its arms extending through the matching chordal slots 32 and 60.

To anchor the cable 13 in the tube 10, the pull rod is positioned in the tube with the vertical hole 48 beneath the hole 30 of the tube prior to assembly of the sleeve 54. When the ball member 51 is moved into the tube through these aligned holes and rests in the conical slot 50, the rod is moved rearwardly to move the holes out of alignment. During operation, the hole 48 is never permitted to become aligned with the hole 30 due to the fact that the rearward face of the connector sleeve 54 extends into the tube and will be contacted by the forward end of the pull rod before such alignment takes place.

For the purpose of disassembling the brake lever assembly, there is provided in the wall of the tube 10 an aperture 65 (Figure 1). By moving the rod 11 forwardly, the guide pin 15 may be aligned with this aperture and, then by placing a drive pin in the aperture against the inner end of the guide pin 15, the guide pin may be forced out of the rod and thus the pull rod may be withdrawn from the tubular housing.

The released position of the brake-actuating assembly is shown in Figure 4. When it is desired to set the brakes, the handle 12 is pulled to the rear, engaging the ratchet teeth 14 of the pull rod 11 in the pawls 46 disposed across the structure 35. The guide pin 15 will move axially rearward as the handle is pulled out of the housing. Variation in the holding power of the brake may be obtained by the extent to which the ratchet teeth 14 are drawn into the pawls 46.

Release of the brake is accomplished by rotating the handle 12 counterclockwise as seen in Figures 3 and 5, thereby moving the ratchet teeth out of engagement with the pawls and causing the guide pin 15 to rotate into contact with the wall of the slot 23 (Figure 3). The rod 11 is then moved forwardly with the aid of the tension in the brake cable. When the guide pin begins to ride along the slanted cam surface 19, rotation of the pull rod 11 is effected and the guide pin 15 causes the rod 10 to rotate clockwise and return to the position indicated in Figure 2, wherein the ratchet teeth 14 are disposed for contacting the pawls 46 immediately when the pull rod 11 is again drawn forwardly to set the brakes.

In Figure 9 is shown a second embodiment of the straight pull brake lever assembly of the present invention. This embodiment comprises a pull rod 11' having a handle 12' and guided in a tube structure 10' including a support housing 35' which is disposed in a substantially inverted position with walls 37' extending downwardly and having laterally extending coplanar flanges 38' to which is secured a spacer plate 70, made of resilient material such as rubber. An underturned portion of the instrument panel 71, having a grommet 72 through which the pull rod 11' is slidably projected, is secured underneath the connecting and guiding plate by means of a plurality of bolts 73. The grommet 72 is preferably made of a resilient material, such as rubber, for the purpose of deadening noises and rattles incident to the operation of lever mechanisms.

A circumferential groove 62 is disposed on the rear portion of the pull rod 11' and is so located that one of the pawls in the housing 35' will drop therein to limit the forward movement of the rod in the tube before the ball member on the cable becomes aligned with the entrance groove in the tube. Alternately, a tooth, such as a ratchet tooth 14 may be provided on the pull rod 11' adjacent the rear portion thereof to receive one of the pawls to prevent this alignment.

Thus this embodiment provides means for direct projection of the pull rod 11' through the instrument panel of the automobile and also provides means for securing the brake lever assembly in concealed relation upon a downwardly and forwardly inclined portion of said instrument panel.

It will, of course, be understood that various details of construction may be varied through a substantial range without departing from the principles of this invention and it is, therefore not the purpose to limit the patent granted hereon otherwise than necessitated by the scope of the appended claims.

I claim as my invention:

1. In combination in a straight pull brake lever assembly, a pull rod, a tubular guide housing for the pull rod having a longitudinal slot intermediately therein, means for attaching a brake cable to the forward end of the pull rod, the opposite end of the pull rod having a handle projecting beyond the adjacent end of the tube, ratchet teeth disposed across said rod, pawls carried by said guide housing engageable with said ratchet teeth for holding the pull rod in incremental brake setting positions within the housing, the pull rod being rotatable to clear the ratchet teeth from the pawls, a camming surface on one wall defining the slot in said housing and a cam follower member projecting outwardly from said pull rod into said slot for contacting said camming surface, said camming surface being arranged at the forward end of said slot to positively turn the pull rod to ratcheting position from the pawl clearing position and as an incident to brake releasing longitudinal movement of the rod.

2. In combination in a straight pull brake lever assembly, a pull rod, a tubular guide housing for the pull rod having a longitudinal slot therein, means for attaching a brake cable to the forward end of the pull rod, the opposite end of the pull rod having a handle projecting beyond the adjacent end of the tube, ratchet teeth disposed across said rod, pawls carried by said guide housing engageable with said ratchet teeth for holding the pull rod in incremental brake setting positions within the housing, the pull rod being rotatable to clear the ratchet teeth from the pawls, and camming means associated with said pull rod and with said guide housing for rotating said pull rod in said housing, including a pin projecting radially outwardly from said pull rod into said slot, said slot defining a longitudinally extending wall for directing said pin axially forwardly after said pull rod has been rotated to pawl releasing position, and a slanted wall portion at the forward end of said slot for rotating said pull rod back to ratcheting position.

3. In combination in a brake actuating mechanism of the character described, a rod member having ratchet teeth thereon, supporting and guiding structure for said member including pawl means engageable with the ratchet teeth on the rod member for retaining the rod member in incrementally adjusted position longitudinally and a guide tube for the rod member comprising separate edge portions joined in abutment adjacent to opposite ends and defining a longitudinal slot therebetween intermediate said end portions, one of said edge portions having a cam surface diverging toward the opposite edge portion adjacent to one end of the slot, and a projection extending outwardly from said rod member into said slot and normally engaging with the second of said edge portions within said slot and being movable into engagement with said one edge portion when the rod is turned for releasing the ratchet teeth from the pawl means, said cam portion being engageable by said projection to return the rod rotatably into the ratcheting position thereof relative to the pawl means as an incident to longitudinal movement of the rod member toward said one end of the slot.

4. In combination in a brake lever assembly of the character described, a reciprocable and rotatable rod member, a tubular guide for said rod member, a longitudinal slot in the wall of said guide member, said slot comprising a relatively narrow section at one end thereof and a wider section throughout the remainder thereof with a cam edge joining one wall of the wider section with a wall of the narrower section, and a lateral projection on said rod extending into said slot and dimensioned to be received in said narrower slot section and being movable from the narrower section into the wider section in the longitudinal movement of the rod and when in the wider section limiting rotary movement of the rod to the width of said wider section, said projection being engageable with said cam edge on longitudinal movement of the rod toward said narrower section to be thereby directed into said narrower section from the wider section of the slot.

5. In combination in a brake actuating assembly of the character described, a rod member having a handle portion at one end and adapted to have connection with a vehicle brake mechanism at the opposite end, a tubular guide substantially encasing the rod member forwardly of the handle and serving to guide the rod for reciprocal and rotary movement, means on said tubular guide adjacent the rear end thereof for attachment to a support, pawl means carried by said tubular guide adjacent to said attachment means and engaging one side of the rod, said side of the rod having ratchet teeth therein engageable by the pawl means for retaining the rod in incremental brake setting position when the rod is pulled rearwardly, a longitudinal slot in said tubular member forwardly from said pawl means, and a lateral projection extending from said rod into said slot, said slot being wider than said projection and permitting a limited range of lateral movement of the projection in response to rotary movement of the rod to an extent in which the rod is in ratcheting position relative to said pawl means when said projection engages one edge of the slot and is in released position relative to the pawl means when the projection is in engagement with the opposite edge of the slot, whereby the slot and projection define rotary limits for the rod and the slot affords longitudinal clearance for the projection for substantial reciprocal brake setting and release movements of the rod, said one edge of the slot having a cam surface adjacent to its forward end converging toward said opposite edge for engagement by said projection to effect positive rotation of the rod toward ratcheting position during forward movement of the rod into brake releasing position.

6. In combination in a brake actuating mechanism of the character described, an elongated tubular guide member having means at the rear end thereof for attachment to the instrument panel of an automobile, a flange carried by said tubular member adjacent to but spaced rearwardly from the forward end thereof for attachment to the fire wall or the like of the vehicle with the forward end portion of the tubular member extending forwardly therebeyond, and a reciprocal brake actuating rod guided within said tubular member and having a handle portion engageable rearwardly of the rear end of said tubular member and a forward end portion extensible through said flange and into the forwardly projecting portion of the tubular member, the forward end portion of the tubular member being formed to provide access to the forward end portion of the rod for attachment thereto of a brake actuating cable and being also constructed for attachment thereto of a cable guard attaching member.

7. In a brake lever assembly including a guide housing having a pawl member, a pull rod reciprocal in said housing between a rear brake-setting and a forward brake-releasing position and having a series of ratchet teeth on one side engageable with the pawl on the guide housing and releasable from the pawl by rotation of the rod to present a smooth surface to the pawl, the improvement which comprises a circumferential groove in said pull rod spaced rearwardly from the last ratchet tooth in said series and engageable by the pawl member to limit the axial movement of the pull rod forwardly relative to the housing in any rotary position of the rod when the rod is fully released.

8. In a brake actuating assembly of the character described, a tubular guide member, a pull rod reciprocable and rotatable in said guide member and having a handle at its rear end beyond the rear end of the tubular member, a longitudinal slot intermediately in said tubular member, a transverse hole through the pull rod, a guide pin extending through said hole and projecting beyond the side of the rod into said slot, the slot being wider than said pin and affording limit upon rotary movement of the rod in the guide member by engagement of the pin with the respective opposite sides of the slot, an opening in the tubular member opposite the forward end of said slot for drive out access to said pin, and means on the tubular member for limiting forward movement of the rod to maintain said hole normally out of registration with said access opening.

9. In combination in a straight pull brake lever assembly of the character described, a pull rod, a guide tube for said pull rod, said tube having a substantially circular aperture spaced from the forward end thereof and a slot extending from said aperture toward the forward end of the tube, said slot and said circular aperture being of a size to permit passage therethrough of a cable and a ball-shaped anchoring member fastened thereto, means on said pull rod for interengagement with the anchoring member of the cable after insertion of the anchoring member through said aperture and clearance of the cable through the slot, and means operable after assembly of the cable and anchoring member with the rod to hold the rod against movement beyond a position wherein the anchoring member is out of registration with the circular aperture so as to prevent unintentional escape of the anchoring member from the rod.

RAY A. SANDBERG.

REFERENCES CITED

The following references are of record in the file of this patent:

UNITED STATES PATENTS

| Number | Name | Date |
|---|---|---|
| 1,391,360 | Beach | Sept. 20, 1921 |
| 1,575,826 | Gretz | Mar. 9, 1926 |
| 1,713,842 | Link | May 21, 1929 |
| 1,800,578 | Webb | Apr. 14, 1937 |
| 1,986,232 | Weatherhead | Jan. 1, 1935 |
| 2,021,241 | Mall | Nov. 17, 1935 |
| 2,030,672 | Winning | Feb. 11, 1936 |
| 2,073,108 | Kesling | Mar. 9, 1937 |
| 2,126,234 | Weber | Aug. 9, 1938 |
| 2,177,456 | Irving | Oct. 24, 1939 |
| 2,186,277 | Tetons | Jan. 9, 1940 |
| 2,304,266 | McCarthy | Dec. 8, 1942 |
| 2,369,910 | Morgan | Feb. 20, 1945 |
| 2,377,691 | Jandus | June 5, 1945 |
| 2,429,224 | Ferguson | Oct. 21, 1947 |
| 2,461,378 | Grose | Feb. 8, 1949 |